United States Patent
Feldman et al.

(10) Patent No.: US 7,738,402 B2
(45) Date of Patent: Jun. 15, 2010

(54) AD HOC COMMUNICATION SYSTEM AND METHOD FOR ROUTING SPEECH PACKETS THEREIN

(75) Inventors: Sharoni Feldman, Haifa (IL); Yosi Ben Asher, Ma'Ale Tivon (IL)

(73) Assignee: Carmel-Haifa University Economic Corp. Ltd., Haifa (IL)

( * ) Notice: Subject to any disclaimer, the term of this patent is extended or adjusted under 35 U.S.C. 154(b) by 1041 days.

(21) Appl. No.: 11/312,445

(22) Filed: Dec. 21, 2005

(65) Prior Publication Data

US 2006/0153099 A1 Jul. 13, 2006

Related U.S. Application Data

(60) Provisional application No. 60/638,239, filed on Dec. 23, 2004.

(51) Int. Cl.
*H04L 12/28* (2006.01)
*H04Q 7/00* (2006.01)

(52) U.S. Cl. .................................... 370/254; 370/328

(58) Field of Classification Search .............. 370/252, 370/254–256, 328, 338, 400, 401
See application file for complete search history.

(56) References Cited

U.S. PATENT DOCUMENTS

| | | | | |
|---|---|---|---|---|
| 5,245,609 A | * | 9/1993 | Ofek et al. | 370/235 |
| 5,606,669 A | * | 2/1997 | Bertin et al. | 709/223 |
| 6,463,033 B1 | * | 10/2002 | Harshavardhana | 370/222 |
| 7,304,955 B2 | * | 12/2007 | Lee | 370/237 |
| 7,366,111 B2 | * | 4/2008 | Thubert et al. | 370/254 |
| 2002/0044549 A1 | | 4/2002 | Johansson et al. | |
| 2003/0126299 A1 | * | 7/2003 | Shah-Heydari | 709/252 |

FOREIGN PATENT DOCUMENTS

| WO | WO 02/23832 | 3/2002 |
|---|---|---|
| WO | WO 2004/107679 | 12/2004 |

OTHER PUBLICATIONS

Ananth Rao et al; "Geographic Routing without Location Information"; MOBICOM '03, "On line!"; Retrieved from the Internet: URL:http://www.cs.ucla.edu/classes/fall03/cs218/paper/p96-rao.pdf; pp. 96-108, 2003.
Charles E. Perkins, et al; "Ad-hoc On-Demand Distance Vector Routing"; www.cs.ucsb.edu/~ravenben/classes/papers/aodv-wmcsa99.pdf; in MILCOM '97 panel on Ad Hoc Networks, Nov. 1997, pp. 1-11.

* cited by examiner

*Primary Examiner*—Hong Cho
(74) *Attorney, Agent, or Firm*—Browdy and Neimark, PLLC (57) ABSTRACT

A method for organizing a plurality of communication devices of an ad hoc communication system into a communication network. The devices are organized into one or more communication graphs where at least one of the graphs is a rooted tree. The invention also provides an ad hoc communication system wherein the devices are organized into one or more communication graphs, where at least one of the graphs is a rooted tree. A method for routing a communication session in the system is also provided where a session is routed from the calling node to the tree root and from the tree root to the called node. In a preferred embodiment, shortcuts are sought in the session route.

6 Claims, 6 Drawing Sheets

AD HOC COMMUNICATION SYSTEM AND METHOD FOR ROUTING SPEECH PACKETS THEREIN

This application claims the benefit of prior U.S. provisional patent application No. 60/638,239 filed Dec. 23, 2004, the contents of which are hereby incorporated by reference in their entirety.

FIELD OF THE INVENTION

This invention generally relates to communication networks, and more specifically to ad hoc communication networks.

BACKGROUND OF THE INVENTION

An ad hoc communication system consists of a plurality of mobile wireless communication devices, also referred to herein simply as "devices", "users" or "nodes". Unlike a cellular telephone network, an ad hoc network does not rely on a set of fixed base stations to follow the movement of the devices or to route a connection between two devices. Since the transmission range of each device is limited, a device in the network can communicate directly only with other devices that are within its transmission range. Since the devices are mobile, the set of devices within the transmission range of a given device changes dynamically over time. Typically, devices continually enter and leave a given device's transmission range. Thus, as a device moves it may break communication with some devices while creating new connections with other devices. Every device periodically sends a "hello" message that is received by all devices within its transmission range. Every node receives hello messages from the nodes within its transmission range so that every node is periodically updated of the nodes within its transmission range.

The basic communication structure is therefore a dynamic graph in which each communication device is a node and an edge between two nodes indicates that the two nodes are in each other's transmission range. Each device can also act as a router by transferring speech or data packets from a first device in its range to a second device in its range when the first and second devices are not within each other's range. Thus, two devices can exchange speech packets only if there is a path of edges in the graph joining the two devices. Since new edges constantly emerge in the graph while other edges are deleted, a routing protocol is required that can cope with this dynamic situation, while attempting to optimize the allocation of device resources in order to maximize the amount and length of communication sessions available to the devices.

Ad hoc communication systems are classified according to the routing protocol that is used. In a table-driven routing protocol, each node maintains a table specifying a route to every other node in the network. When a first node (referred to herein as the "calling node") initiates a session to a second node (referred to herein as the "called node"), the route from the calling node to the called node specified in the calling node's table is invoked.

In a search-driven routing protocol, for each communication session requested by a calling node, a search is performed to locate a path from the calling to the called node. The calling node broadcasts a route request packet to its neighbors. Every node receiving this request that is not the called node adds its own identity to the request and re-broadcasts the message to its neighbors. When the request reaches the called node, the full route appears in the message. Typically, each search requires flooding the network with search messages until the called node is reached and a routing path has been found. The algorithms in this class may need a quadratic number of messages (in the number of nodes) to perform a search for a route. The drawback of search driven protocols lies in the delay that occurs before a call session can start while the path search is being conducted.

The AODV (On-demand Distance Vector) routing algorithm (C. E. Perkins, and E. M. Royer. "Ad-hoc On-Demand Distance Vector Routing," Second IEEE Workshop on Mobile Computing Systems and Applications, pp. 90-100, February 1999.) combines on demand search with recent destination routing information. A search for a route to a given called node is performed by flooding, but each node maintains a list of all its recent routings, so that the flooding can be reduced when it reaches an intermediate node that has the destination in its recent routing list. However, a burst of route request messages may flood the system especially in large condensed networks when many nodes try to create sessions simultaneously.

Another type of ad-hoc algorithm uses the GPS coordinates of each node to forward packets from one node to the neighboring node having the shortest Euclidian distance to the destination. The routing is oblivious and thus potentially more efficient than the one used in the AODV type of algorithm. Using GPS can be regarded as a way of assigning grid coordinates in the field to every node and using the grid metric to select the shortest routing paths.

Rao et al. (A. Rao, S. Ratnasamy, C. Papadimitrou, S. Shenker, I. Stoica, "Geographic Routing withhout Location Information", ACM MobiCom 2003.) discloses use of virtual coordinates that approximate geographical coordinates without using GPS. The nodes are embedded in a grid wherein Euclidian distances in the plane are replaced by connectivity distances in the dynamic communication graph. The algorithm has three stages: 1) the nodes on the perimeter are identified, 2) the virtual coordinates of the perimeter are computed, and 3) based on the perimeter, virtual coordinates of internal nodes are computed. Virtual coordinates are computed using a relaxation method wherein each node updates its coordinates based on the coordinates of its neighbors.

SUMMARY OF THE INVENTION

As used in the following description and set of claims, the term "ad hoc communication system" refers to a communication system comprising a plurality of mobile wireless communication devices where the system does not comprise any fixed base stations that follow the movement of the devices or that route a connection between two devices in the system.

In one of its aspects, the present invention provides a method for organizing communication devices of an ad hoc communication system into one or more communication graphs. In accordance with the invention, the devices are organized into one or more graphs, where at least one of the graphs is a rooted tree. An edge in a rooted tree between two nodes indicates that the two nodes are within each other's transmission range. In general however, a rooted tree will not contain all possible direct communication links between a node and its neighbors. In a preferred embodiment of the invention, the devices are organized into one or more graphs, all of which are rooted trees.

In another of its aspects, the invention provides an ad hoc communication system, in which the communication devices are organized into one or more graphs, with at least one of the graphs being a rooted tree.

In another of its aspects, the present invention provides a method for routing a communication session between a calling node and a called node in an ad hoc communication system. In a rooted tree, a unique path exists joining each node to the tree root, and, each node can be assigned a unique set of coordinates specifying the path from the tree root to the node. Thus, in one embodiment of this aspect of the invention, the communication devices are organized into one or more rooted trees and a communication session between a calling node and a called node in the same rooted tree is routed from the calling node to the tree root along the unique path joining them, and then from the root to the called node along the unique root joining them. In a preferred embodiment, one or more short cuts in this route are sought. A short cut is a path joining a first node in the tree to a second node in the tree, where edges in the path join devises in each other's transmission range but are not edges in the rooted tree. The communication session is then routed from the calling node to the first node in the shortcut along the tree, then to the last node in the short cut along the short cut, and from there to the called node along the tree.

A rooted tree with shortcuts is better suited to handle the dynamic case of ad hoc networks than a grid metric. In particular, adding a new node to an existing rooted tree requires only changing the coordinates of that node alone while adding a new node to an existing grid may require changing the coordinates of most of the grid nodes. When a node leaves a tree, it will be necessary to update the coordinates of every node in that node's sub-tree, however, usually the number of updates required for this is significantly less than that needed in the case of a grid metric. In particular adding and deleting several nodes at the same time is more complex in grids than in trees as the coordinates of most of the nodes in the grid are affected by all changes in the grid structure, while in trees the changes in two disjoint sub-trees do not affect one another.

Only nodes that belong to the same tree can create communication sessions among themselves. Complete connectivity is achieved when a session can be created between any two nodes in the field, and this is possible only when all of the nodes are organized into a single tree. Since a node may break away from a tree or fuse with a tree, the connectivity of the nodes changes dynamically. Thus, in a preferred embodiment of the invention, two separate trees fuse together into a single tree whenever possible in order to organize the nodes into a minimal number of rooted trees so as to ensure maximal connectivity. Every node that receives a hello message checks to which tree the node that sent the message belongs. If the nodes belong to different trees, they will initiate a fusion process that fuses the two trees into a single tree.

A simulator was developed and used to compare the performance of the algorithm of the invention with that of the AODV algorithm. As demonstrated below, results obtained using the simulator show that the method of the invention for ad hoc routing provided a larger number and duration of communication sessions available to the nodes in comparison to AODV under the same conditions.

Thus, in one of its aspects, the present invention provides a method for organizing a plurality of communication devices of an ad hoc communication system into a communication network, each device having a transmission range, the method comprising a step of organizing the devices into one or more communication graphs, each communication graph comprising one or more nodes, each node representing a device of the system and an edge joining two nodes indicating that the two nodes are in each other's transmission range, wherein at least one of the graphs is a rooted tree.

In another of its aspects, the invention provides an ad hoc communication system comprising a plurality of communication devices, each device having a transmission range, wherein the devices are organized into one or more communication graphs, each communication graph comprising one or more nodes, each node representing a device of the system and an edge joining two nodes indicating that the two nodes are in each other's transmission range, wherein at least one of the graphs is a rooted tree.

In yet another of its aspects, the invention provides a method for routing a communication session in an ad hoc communication system from a calling node to a called node, the calling node and the called node being nodes in a rooted tree of nodes of the system, comprising routing the session from the calling node to the tree root and from the tree root to the called node.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 6b shows the system of

FIG. 6a after migration of a node from one tree to the other tree;

DETAILED DESCRIPTION OF PREFERRED EMBODIMENTS

Figure 1A:
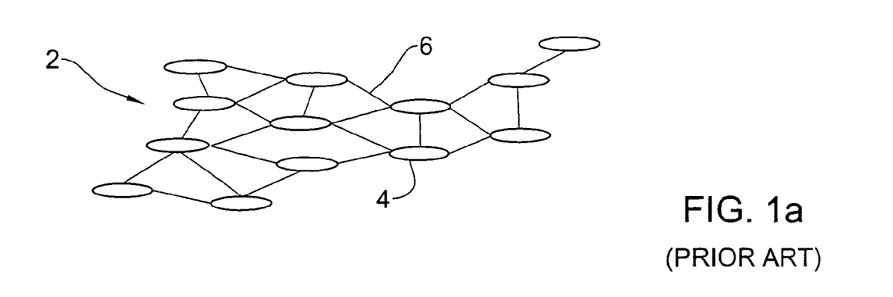
FIG. 1a shows schematically an ad hoc communication system consisting of a plurality of mobile communication devices, and FIG. 1b.
Figure 1B:
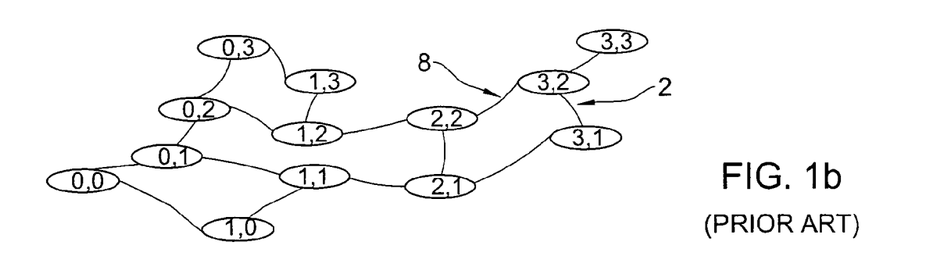
FIG. 1b shows the system after having been organized into a grid and grid coordinates assigned to the nodes by prior art methods.

FIG. 1a shows schematically an ad hoc communication system 2 consisting of a plurality of mobile communication devices 4. The devices 4 are organized into a graph having edges 6, where an edge between two devices 4 indicates that the two devices are in each others transmission range. In the graph of FIG. 1a, all pairs of devices in each other's transmission range are indicated by an edge 6. FIG. 1b shows the system 2 after having been organized into a grid 8 and grid coordinates assigned to the nodes, by the prior art method disclosed in Rao et al. (supra).

Figure 2:
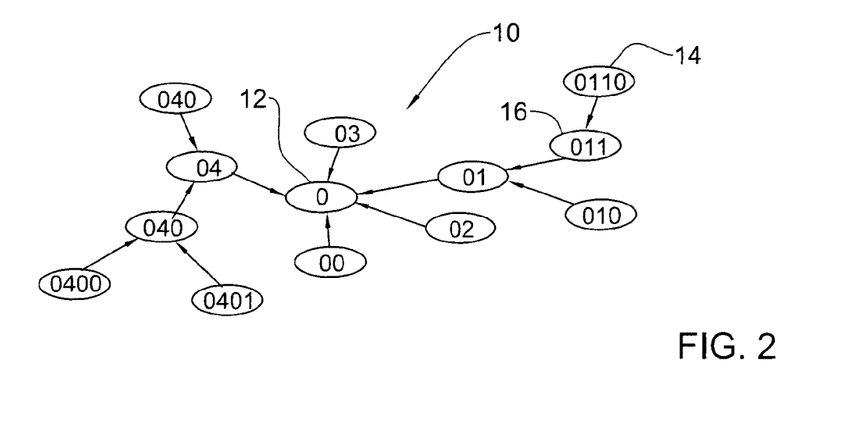
FIG. 2 shows an ad hoc communication system organized in a rooted tree in accordance with one embodiment of the invention.
Figure 3A:
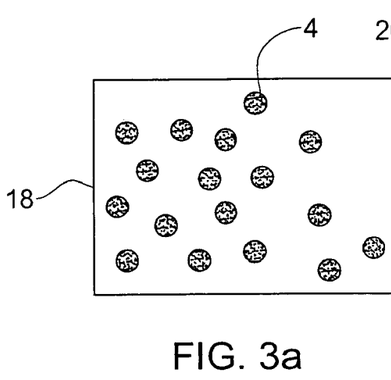
FIG. 3a shows locations of the nodes in rooted trees.
Figure 3B:
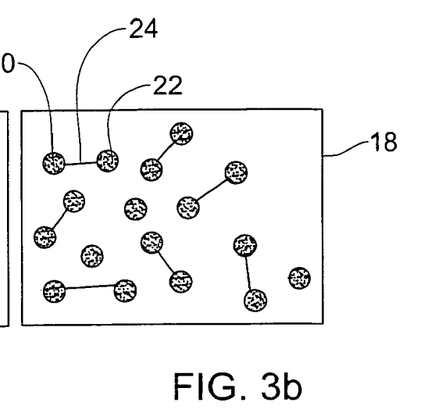
FIG. 3b shows two nodes in each other's transmission range forming a rooted tree.
Figure 3C:
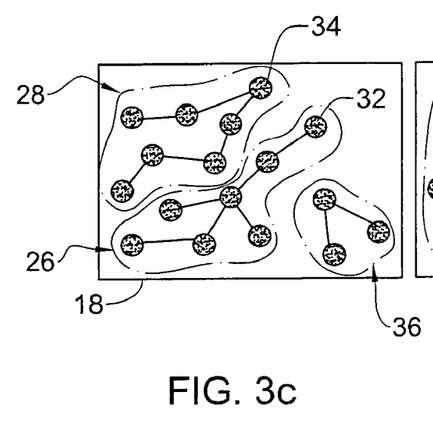
FIG. 3c shows three trees formed from the two nodes of FIG. 3b.
Figure 3D:
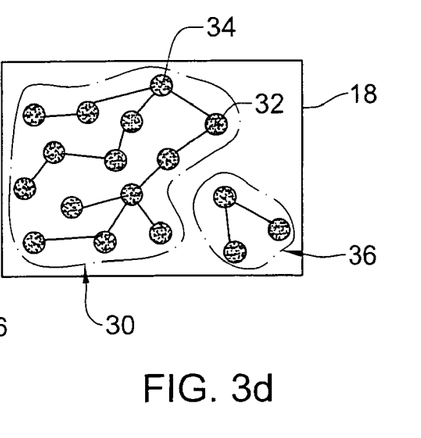
FIG. 3d shows a larger tree formed from the trees in FIG. 3c.

In one of its aspects, the present invention provides a method for organizing communication devices of an ad hoc communication system into one or more communication graphs. In accordance with the invention, the devices are organized into one or more graphs, where at least one of the graphs is a rooted tree. FIG. 2 shows the system 2 organized into a rooted tree 10, in accordance with one embodiment of this aspect of the invention. The rooted tree 10 has a root node 12. In a rooted tree, a unique path exists joining each node to the tree root, and, each node can be assigned a unique set of coordinates specifying the path from the tree root to the node. As shown in FIG. 2, coordinates in a rooted tree may be assigned by the following process. The root node 12 of the tree is assigned the coordinates <0>. For each node, the sons of the node in the tree are numbered arbitrarily, and the coordinates of a son are obtained by appending the son's number to the coordinates of the father. Thus, for example, a node 14 has coordinates <0.1.1.0> indicating that the node 14 is son number 0 of the node 16 having the coordinates <0.1.1>. The unique path joining the root to node 14 is the path consisting of the nodes <0> (the root), <0.1>, <0.1.1> (the node 16), and <0.1.1.0> (the node 14). When it is important to indicate the name of the tree to which a node belongs, the tree name maybe appended to the coordinates of the node. Each device in the ad hoc system is assigned a unique node identification number, also referred to herein as the node's "id". A name assigned to a tree may be, for example, the id of the root node.

Every node v broadcasts periodically a hello message. This message carries information about v, the coordinates of its neighbors that share the same tree with v, and the ids of its father and sons. Every node, receiving a hello message from the node v, regardless of the source tree, stores/updates the information about v. The ids are used to validate that v agrees with the receiving node about the type of "relationship" between them. When a node disagrees about the type of relationship for a predetermined amount of time, the receiving node assumes that something went wrong, and resets the type of the relationship to a "stranger node".

In a preferred embodiment of this aspect of the invention, the nodes are organized into rooted trees in an iterative process shown in FIG. 3. In FIG. 3a, the locations of the nodes 4 in a field 18 are shown. In FIG. 3b, two nodes in each other's transmission range, for example the nodes 20 and 22 form a rooted tree 24 of two nodes. One of the two nodes is designated as the tree root by a predetermined rule. For example, the tree having the highest id may be designated as the tree root. Two trees, of any size, may fuse into a single, larger tree when a first node in one of the trees, and a second node in the other tree are found to be in each other's the transmission range. Thus for example, as shown in FIG. 3c, a first tree 26 and a second tree 28 will fuse into a larger tree 30 shown in FIG. 3d, when a node 32 of the first tree and a node 34 of the second tree are in each other's transmission range. The fusing node is assigned new coordinates in the new tree according to the node's new position. A tree 36 that has formed cannot fuse with the tree 30 because there does not exist a first node from the tree 36 and a second node from the tree 30 with the two nodes in each other's transmission range.

Figure 4A:
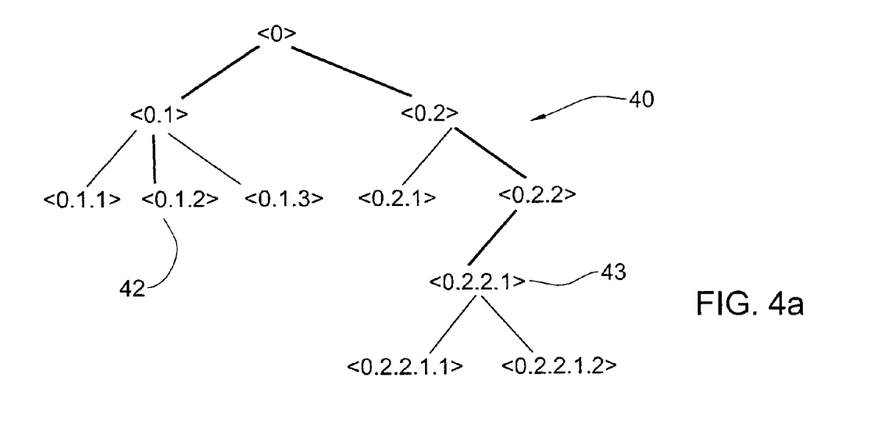
FIG. 4a shows routing of a message in a rooted tree.

In another of its aspects, the present invention provides a method for routing a communication session between a calling node and a called node in an ad hoc communication system. In a rooted tree, a unique path exists joining each node to the tree root. In accordance with one embodiment of the invention, a communication session between a calling node and a called node is routed from the calling node to the tree root along the unique path joining them, and then from the root to the called node along the unique root joining them. As shown above, the path from a node to the tree root is easily determined from the node's coordinates in the tree. FIG. 4A shows a rooted tree graph 40 and a session route from a node 42 having the coordinates <0.1.2> to a node 43 having the coordinates <0.2.2.1>. The session route (shown in FIG. 4a by thick edges) has four hops and proceeds along the path <0.1.2> (the calling node), <0.1>, <0> (the tree root), <0.2>, <0.2.2>, and <0.2.2.1> (the called node).

Figure 4B:
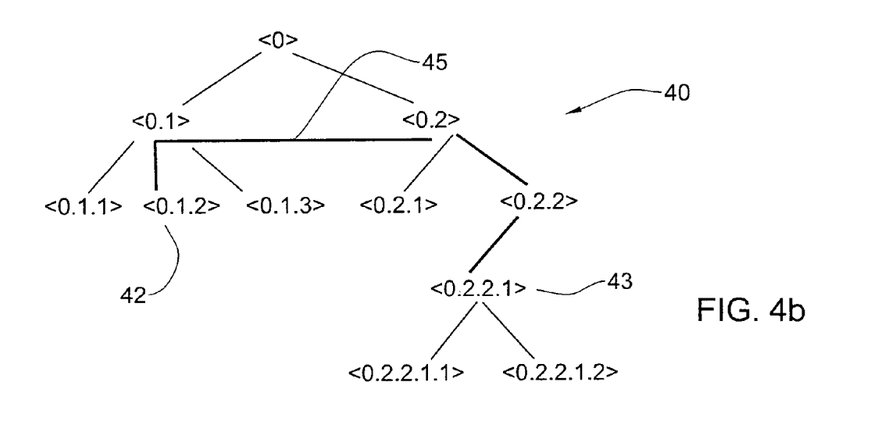
FIG. 4b shows routing of a message in the rooted tree of FIG. 4a after introduction of a shortcut.

In a preferred embodiment, one or more short cuts in this route are sought. Each node in the route stores a list of all its neighbors and a list of all of its neighbor's neighbors. When a first node on the route discovers a second node on the route that is either one of the first node's neighbors or one of its neighbor's neighbors, a short cut is introduced in the route between the first and second nodes. The short cut will thus consist of one or two edges, depending on whether the first and second nodes are neighbors of each other, or have a common neighbor. FIG. 4B shows the route shown in FIG. 4A after being modified by incorporating a shortcut. This shortcut has a single edge 45 joining nodes <0.1> and <0.2>. The modified route incorporating the short cut has three hops and proceeds along the path of nodes <0.1.2>, <0.1>, <0.2.2>, and <0.2.2.1>. This short cut thus reduced the number of hops in the route from four to three.

Figure 5:
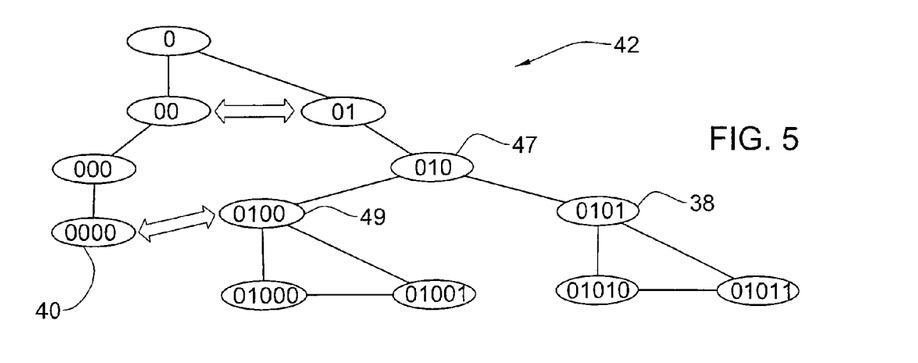
FIG. 5 shows introduction of a shortcut in a sessions path.

FIG. 5 shows a rooted tree 42. A path from a node 38 having the coordinates <0.1.0.1> to a node 40 having the coordinates <0.0.0.0> will initially follow the path <0.1.0.1>, <0.1.0>, <0.1>, <0>, <0.0>, <0.0.0>, <0.0.0.0>. A short cut having two hops can be incorporated into this path from a node 47 having coordinates <0.1.0>, via a node 49 having coordinates <0.1.0.0> to the node 40 (<0.0.0.0>). The route incorporating this short cut proceeds along the path of nodes <0.1.0.1>, <0.1.0>, <0.1.0.0>, <0.0.0.0>. This short cut reduces the number of hops in the route from 6 to 3

In the ad hoc communication system of the preferred embodiment of the invention, each node in the system maintains an internal data structure that is divided into two major parts. The connectivity part keeps updated data describing the node's relations with other nodes in the field. The sessions part stores the sessions control information. Every session uses a local data structure target node session-cell that keeps the exact state of the session which is the number of nodes of the tree. Every node in a tree also holds its sub-tree size, which is the number of nodes of the sub-tree.

Each node stores the id of its neighbors, its father and any sons, in order to manage its connectivity with its neighbors. The node also stores the coordinates and size of each son's sub-tree A neighboring node can be from the same tree or from an adjacent tree. For every neighbor of a node v that belongs to v's tree, v keeps also a list of their neighbors. This information is used for finding shortcuts.

For tracking the stability of a connection to its father or son, a node counts the number of consecutive times that a hello message was received from a known father/son but with a non-father or non-son indication. Crossing a threshold indicates that there is an inconsistent situation where the father and son do not agree on the relationship between them. In this case, the node resets the connection state to "stranger".

A calling node initiates a communication session and either one of the parties (the calling or called node) can trigger termination of the session. When a node initializes a new session towards a called node, the called node is identified by its id. The calling node may be configured to resume a session in case of a break off. The pair {Calling node-id, Called node-id} uniquely identifies the session. A calling node maintains the called node id, the coordinates of the called node, the id of the next node on the session path and the session state. A called node maintains the calling node id and the id of the previous node on the session path. Transit nodes maintain the calling node and called node ids and the coordinates of the previous and next nodes on the session path Every node handles two state machines: the "true connectivity" state machine that controls the relationships of the node with its neighbors and the "session" state machine that controls every session. Table 1 presents the states of the tree connectivity state machine.

TABLE 1 tree connectivity states

| State | Description |
|---|---|
| Neighbor Loss | A node finds out that a neighbor was lost, it erases the lost node from the neighbors list. This action is triggered by the absence of several consecutive Hello messages from the lost neighbor. |
| Neighbor Addiction | A node v finds that it has a new neighbor u, it will add u to the neighbors list. |
| Father loss | A loss of the father triggers the following activities in the node: (a) The node roots and becomes the root of its sub-tree. (b) The node sends a message (Migration_Notification) to its sons with the new tree details which are the new tree name (which is the root id), the new tree size, and the son's new coordinates. |
| Son loss | When a node finds out that a son is lost, it erases the lost son from the sons list. |
| Son addition | A son is added by adding its descriptive data to the sons list |
| Father Migration | A migrating father will send its sons a message (Migration_Notification). The sons migrate with the father to the new tree. |
| Change in tree size | The root sends embedded in the Hello message the accumulated tree size to his sons. Every son propagates this value in its Hello messages until it reaches the leaves. Every node sends its sub-tree size to his father with its Hello messages. The sub-tree father aggregates the values and updates his father with the new values until it reaches the root. |
| Son migration | A migrating son will send Intention_To_Leave message to its old father indicating that it is no longer its son. The father will remove the son from its list. |

Every node can handle concurrent sessions. The sessions are independent and a termination of a session does not influence the other sessions. Table 2 presents the session states. The following states present the stages of every session. Every successful state ends with a transition to the next state. A failure in any one of the states sets the session to a terminating state.

TABLE 2

Session States

| State | Description |
|---|---|
| Coordinates Resolution | The ID of the Target node will be translated into the Target node coordinates in the tree as explained in 3.4.2. |
| Path Allocation | A speech path between the Source node and Target node is created. |
| Stable | Voice packets are transferred from the session parties. |
| Terminating | The session is cleared and the resources allocated for the session are released. |

Figure 6A:
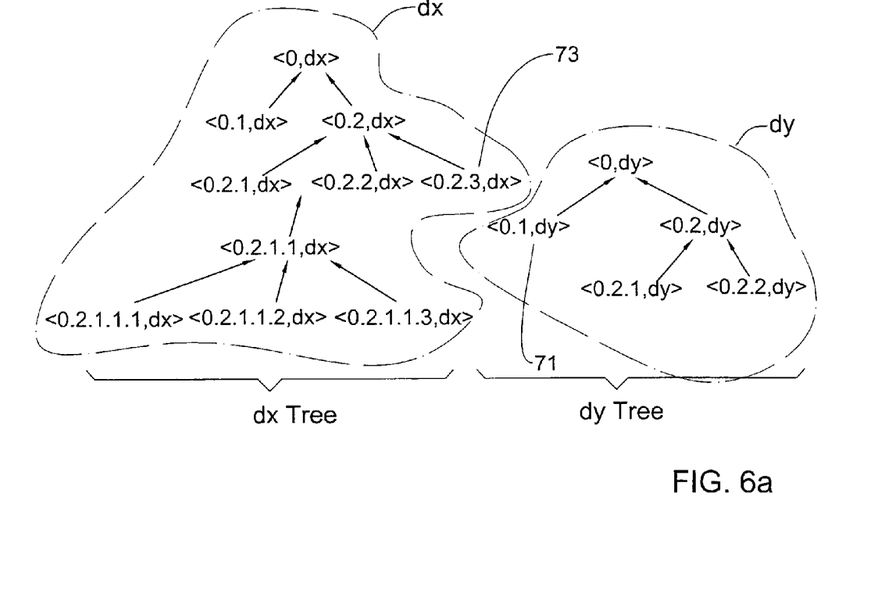
FIG. 6a shows a system comprising two trees.
Figure 6B:
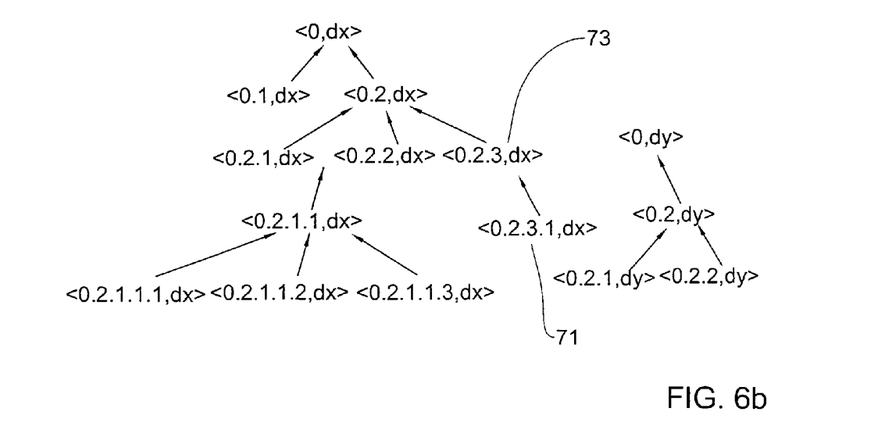

Every node takes autonomous actions targeted to keep itself in a tree, and when possible to join a larger tree. A node migration procedure and a node relocation procedure are carried out in order to support maximal connectivity of all nodes in the field. A node migration procedure allows a node from a smaller tree to migrate to a bigger tree. The migration process maximizes the connectivity of nodes in the field by making bigger trees. For example, as shown in FIG. 6A, when a node 71 having the coordinates <0.1,dy> from tree dy and a node 73 having the coordinates <0.2.3,dx> from tree dx are in each other's transmission range, the node 71 migrates to tree dx and is assigned the coordinates <0.2.3.1,dx>, as shown in FIG. 6B.

Figure 7A:
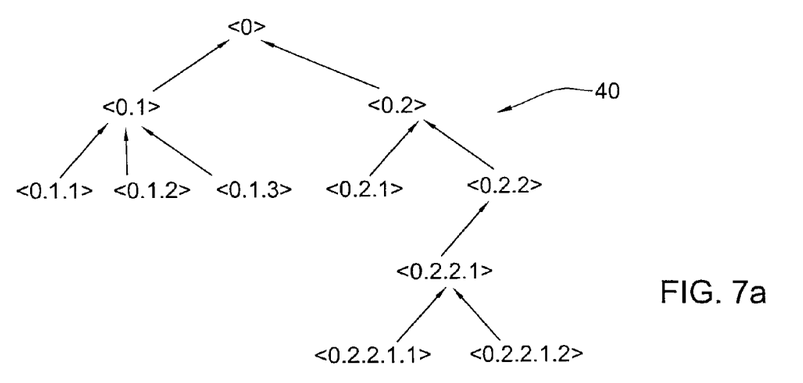
FIG. 7a shows a system prior to node relocation.
Figure 7B:
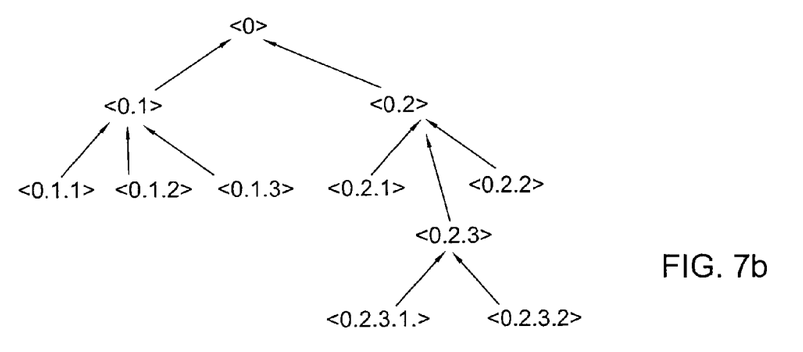
FIG. 7b shows the system of FIG. 7a after node relocation.

A node relocation process is performed inside a tree and is aimed at balancing the tree. A node v, which receives a hello message from a node u inside the same tree checks if it can move to a higher position in the tree by becoming u's son. The relocation process may be executed only if u has not reached a predetermined number of allowed sons. During the relocation process, the relocating node receives new coordinates in the tree and it informs its sons. Every son then updates its new coordinates and sends an update to its sons and so forth until all nodes in v's sub-tree has updated their coordinates in the tree. FIG. 7 shows the relocation process. In FIG. 7A, node <0.2.2.1> and the node <0.2> are in the same tree 40 and are located in each other's transmission range. The node <0.2.2.1> relocates and changes its coordinates to <0.2.3> as shown in FIG. 7B. Its sons <0.2.2.1.1> N and <0.2.2.1.2> change their coordinates to <0.2.3.1> and <0.2.3.2> respectively. A session does not break when one or more transit nodes in the call path change their coordinates within the rooted tree.

A node that lost its father will root. It declares its sub-tree as a tree, and, if it has sons, it notifies them about the new tree-name and the tree size.

The unique identification of a node is the nodes' id but a node is located using its coordinates. A table of the mapping of a node's id and its current coordinates is kept in the sons of the root (the nodes <0.1>, <0.2> and <0.3> in FIG. 2). Periodically and after every migration/relocation event, every node sends a registration message towards the root. This message contains the id and the coordinates of the node. The registration is required to keep the current coordinates of the nodes identified by their IDs in the root sons. For optimization purposes, when a node has several registration messages in its in queue, it combines them to a single message. When this message reaches the root, it is broadcast to the sons of the root. Un-refreshed entries in this table are aged and deleted.

Figure 8:
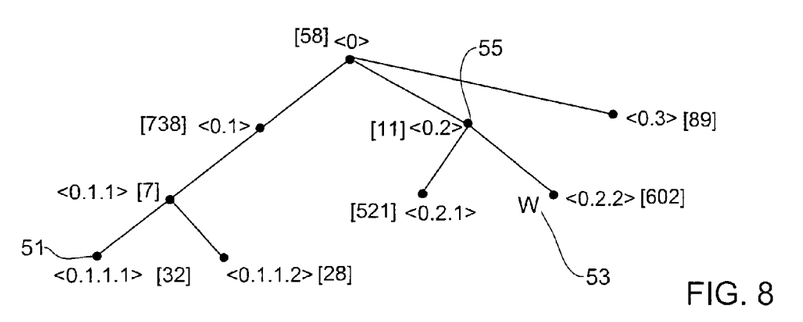
FIG. 8 shows coordinate resolution in a rooted tree.

Coordinate resolution is triggered when a node v initiates a session to node w identified by w's id. The node v sends a "RequestFor CalledCoordinates" message to the root, containing the id of the target node w. If this message arrives at a son of the root, which has the coordinates of w, then a Called-Coordinates message is returned to v. Otherwise the root broadcasts the RequestFor CalledCoordinates to its sons. A son that has the coordinates of w sends a CalledCoordinates message to v. For example, referring to FIG. 8, if a node 51 having id=32 tries to connect to a node 53 having id=602 it will get the coordinates of node 602 from the node 55 having coordinates 0.2.

A path allocation procedure starts immediately after the source node receives the called node's coordinates. This process creates a session path from the calling node to the called node. This process can fail because of various reasons such as the called node is busy, inadequate resources are available to transfer the session, etc. When node v receives a CalledCoordinates message it sends an InitialCallMessage (ICM) towards w. The ICM path is allocated for the new session. When a node receives an ICM message, it checks if it has enough resources for the call. If the answer is "yes" then the ICM is promoted until it reaches w. w responds with a positive Coordinates Complete Message (CCM), which uses the path of the ICM and stabilizes it. If one of the nodes along the path of the ICM or w itself cannot handle the call, then it sends a negative CCM back to v, releasing the path as it moves. Node resources are allocated in the node during the path allocation phase. The ICM message allocates resources for the session. When there are no free resources available, the allocation request is denied. The speech packets of the session use the same path that the ICM allocated. Each node along the path knows the ids of the next and previous nodes in the path. The path is maintained even if nodes along the path change coordinates in the tree.

If a node notices that one of the adjacent path nodes does not transmit speech packets for a while, it assumes the path has been disconnected and it clears the session from its tables. When the source node notices that the path is disconnected, it initiates a new path finding process. When one of the sides hangs up, it sends a TerminateCallMessage (TCM) message to the other side. The TCM message travels on the session path, and clears it, as it hops from one node to another.

Simulations and Results

A simulator was developed for testing the method and system of the invention and running comparable tests on AODV. The simulator provided a full online view of the testing field, nodes movements, voice channels, specific node status including queues status etc. It allows tracing the tree formation, the sessions in real time. The simulator was configured using online screens, support logging, debugging and analysis tools. Table 3 shows parameter values that were used in the simulations.

TABLE 3

Main Simulation Parameters

| Attributes | Selected Values |
|---|---|
| Field Size | 120 × 120 meters |
| No. of nodes in the simulation | 100, 140, 180, 220, 260 and 300 nodes in the field. |
| Node Movement | Speed: 5-7 Km/Hour. Movement direction: Change direction when a node arrives at the field border or randomly with a probability of 0.01 (per tick) |
| Transmission Radius | 27 meters. |
| Session setup retries | 3 retries. The session is dropped after the third unsuccessful retry. |
| Session Length | 5 seconds |

The simulator did not fully model the media access (MAC) layer. In the model used, speech packets do not get lost and transmission reception is granted within the transmission range. The model allowed analysis of the unique features of the present invention. This reduced the number of independent factors and enhanced the debugging and visualization capabilities.

Experiments

Table 4 shows the number of sessions through which more than a certain percentage of the speech messages passed. For example, the row "present invention 100" presents a simulation of the present invention protocol with 100 nodes. The success rate presents the number of sessions that successfully transferred more than the indicated percentage of the voice packets. There are several reasons why a session attempt may not turn into a stable session. The main reasons are: the called node is busy with another session, the called node is not on the source node tree, no resources are available for the session, the calling node or called node disappeared during the session because of power problems, an overflow of the queue in one of the nodes used by the session occurred, or a broken connection due to a transit node that disappeared.

TABLE 4

Successful Sessions

The present invention vs. AODV

| Protocol and number of nodes | Percent Success Rate | | | | |
|---|---|---|---|---|---|
| | 80%-100% | 85%-100% | 90%-100% | 95%-100% | 100% |
| Present invention 100 | 270 | 267 | 264 | 257 | 71 |
| AODV 100 | 188 | 188 | 188 | 184 | 45 |
| Present invention 140 | 341 | 325 | 315 | 289 | 67 |
| AODV 140 | 210 | 210 | 210 | 197 | 25 |
| Present invention 180 | 477 | 462 | 444 | 410 | 95 |
| AODV 180 | 252 | 226 | 172 | 90 | 6 |
| Present invention 220 | 524 | 489 | 452 | 383 | 95 |
| AODV 220 | 176 | 134 | 81 | 31 | 0 |
| Present invention 260 | 535 | 491 | 441 | 377 | 94 |
| AODV 260 | 40 | 23 | 12 | 4 | 0 |
| Present invention 300 | 604 | 558 | 518 | 442 | 112 |
| AODV 300 | 13 | 7 | 3 | 0 | 0 |

Every node handles two types of messages: Control mes

Table 4 shows that the present invention generated a higher number of successful sessions in comparison to AODV at all densities. The gap between the number of sessions generated by the present invention and AODV grew as the density of the nodes increased. A session's quality dropped quicker for AODV than for the present invention as the density increased. This decrease is mainly noticeable at the high densities. For example, in the case of 300 nodes, the present invention successfully handled 604 sessions with a success of 80% and AODV handled successfully only 13 sessions. The present invention handled successfully 112 sessions with 100% message transfer and AODV failed to handle any sessions with 100% message transfer.

Queue Overflow sages that are used to control and generate sessions, and data messages which are used to transfer the speech between the nodes. The total number of messages that a node can handle simultaneously depends on two factors: (1) the number of concurrent sessions managed by the node (Transit sessions or terminating sessions); and the load generated by the control traffic. This load depends on the density of the nodes and on the nature of the algorithm.

The present invention generated a sessions with an order of $O(n)$ messages while AODV generated sessions with the order of $O(n^2)$. Thus, as the number of nodes and hence the density increases, the number of messages handled by a node working under AODV protocol is significantly higher than a node working under protocol of the present invention.

Figure 9:
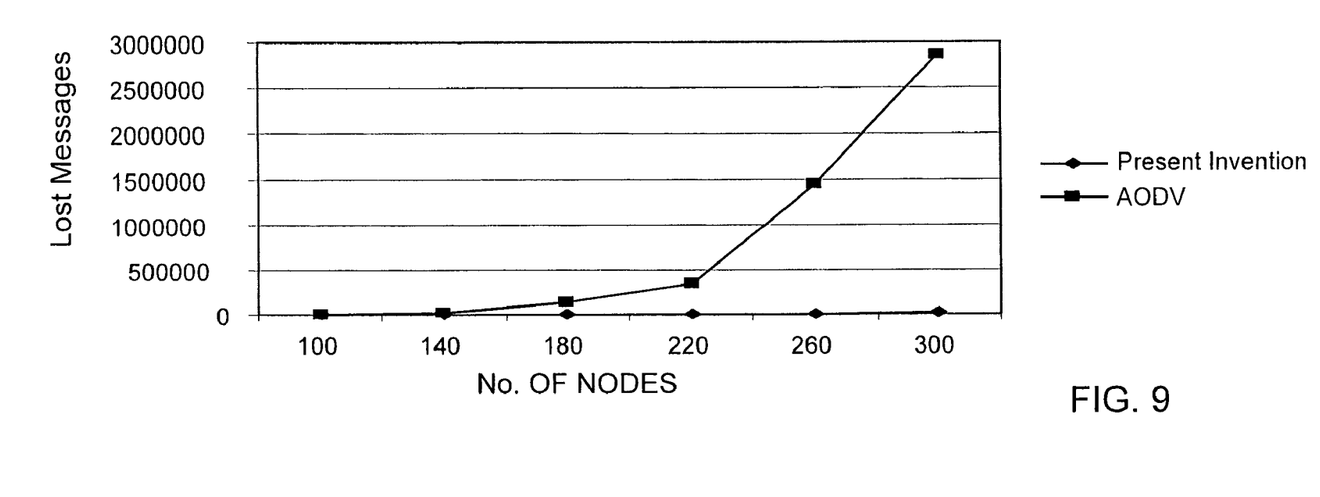
FIG. 9 shows queue overflow as a function of the number of nodes for the present invention and AODV.

FIG. 9 compares the number of lost messages due to queue overflow that occurred by the methods of the present invention and AODV as a function of node density. The node queues were limited to 20 messages. This limit exposes the node to queue overflow and loss of messages. This risk grows as the traffic grows. The number of messages that are lost under AODV grows rapidly in comparison with the present invention. This loss of messages is a central factor decreasing the quality of service.

Figure 10:
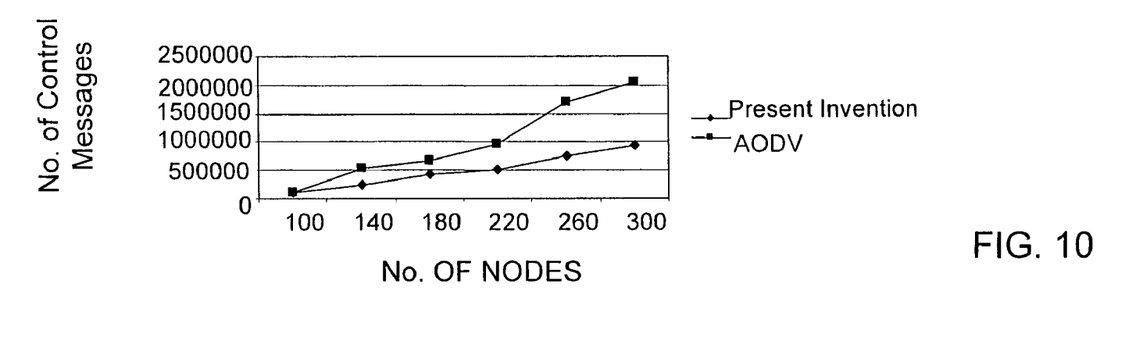
FIG. 10 shows inbound-queue control messages load as a function of the number of nodes for the present invention and AODV.

FIG. 10 compares the load generated on the inbound queues by the control messages by the method of the present invention with that of AODV as a function of node density. At the low densities of up to 180 nodes, a small difference between the number of control messages generated by the present invention and AODV was observed. At densities of over 180 nodes, the number of control messages in AODV increased much quicker than with the method of the present invention. The results shown in FIG. 10 are in agreement with the results shown in FIG. 9. The rapid growth in the volume of control messages is not adequately handled in AODV. This growth results in a loss of control messages and loss of voice messages that share the same queues. The loss of voice messages results in a degradation of service quality.

Session Path Length

Table 5 presents the average path length, which is the average number of hops in sessions in the present invention and AODV. The path created by the present invention is shorter except for the exceptional case of 300 nodes where the path created by AODV seems shorter. However, AODV did not succeed in creating and maintaining a meaningful number of sessions. A shorter path means that fewer transit nodes are involved in the sessions and the message load occupies fewer nodes. A short path reduces the traffic on the nodes that are not involved in the session and thus reduces the chance of queue overflow.

TABLE 5

Session Path Length

| | Number of Nodes in Field | | | | | |
|---|---|---|---|---|---|---|
| | 100 | 140 | 180 | 220 | 260 | 300 |
| The present invention | 4.33 | 4.35 | 4.27 | 4.22 | 4.17 | 4.1 |
| AODV | 4.50 | 4.39 | 4.80 | 4.63 | 4.4 | 3.76 |

The invention claimed is:

1. A method for organizing a plurality of communication devices of an ad hoc communication system into a communication network, each device having a transmission range, the method comprising the steps of:

organizing the devices into one or more communication graphs, each communication graph comprising one or more nodes, each node representing a device of the system and an edge joining two nodes indicating that the two nodes are in each other's transmission range, wherein at least one of the graphs is a rooted tree, and wherein the devices are organized into a rooted tree in an inductive process comprising:

(a) for one or more pairs of nodes consisting of a first node and a second node, the first and second nodes being in each other's transmission range, forming a rooted tree consisting of the first and second nodes, designating one of the first and second nodes as the tree root, and assigning coordinates to the first and second nodes in the rooted tree; and (b) for each pair of a first rooted tree and a second rooted tree, the first rooted tree having a first node and the second rooted tree having a second node, the first and second nodes being in each other's transmission range, merging the first and second trees into a single tree, and reassigning coordinates to one or more nodes in the single tree; and routing a communication session from a calling node to a called node, the calling node and the called node being nodes in a rooted tree of nodes of the system, wherein the session is routed along a route from the calling node to the tree root and from the tree root to the called node, seeking a shortcut in the route, the shortcut being a path from a first node in the route to a second node in the route and consisting of one or more edges not included in the rooted tree, and routing the session from the calling node to the first node of the route along the rooted tree, from the first node of the route to the second node of the route along the shortcut, and from the second node of the route to the called node along the rooted tree.

2. The method according to claim 1 further comprising repeating step (b) until there does not exist a first rooted tree and a second rooted tree, the first rooted tree having a first node and the second rooted tree having a second node with the first and second nodes being in each other's transmission range.

3. The method according to claim 1, wherein each node maintains a list of its neighbors and a list of its neighbor's neighbors, and a shortcut is introduced into the route between a first node on the root and a second node on the route where the first node is either a neighbor of the second node or a neighbor of a neighbor of the second node.

4. An ad hoc communication system comprising a plurality of communication devices, each device having a transmission range, wherein the devices are organized into one or more communication graphs, each communication graph comprising one or more nodes, each node representing a device of the system and an edge joining two nodes indicating that the two nodes are in each other's transmission range, wherein at least one of the graphs is a rooted tree, wherein the devices are organized into a rooted tree in an inductive process comprising:
- (a) for one or more pairs of nodes consisting of a first node and a second node, the first and second nodes being in each other's transmission range, forming a rooted tree consisting of the first and second nodes, designating one of the first and second nodes as the tree root, and assigning coordinates to the first and second nodes in the rooted tree; and
- (b) for each pair of a first rooted tree and a second rooted tree, the first rooted tree having a first node and the second rooted tree having a second node, the first and second nodes being in each other's transmission range, merging the first and second trees into a single tree, and reassigning coordinates to one or more nodes in the single tree; and
- wherein said system is configured to route a communication session from a calling node to a called node, the calling node and the called node being nodes in a rooted tree of nodes of the system wherein the session is routed along a route from the calling node to the tree root and from the tree root to the called node; and
- further configured to seek a shortcut in the route, the shortcut being a path from a first node in the route to a second node in the route and consisting of one or more edges not included in the rooted tree, and the session is routed from the calling node to the first node of the route along the rooted tree, from the first node of the route to the second node of the route along the shortcut, and from the second node of the route to the called node along the rooted tree.

5. The system according to claim 4 further comprising repeating step (b) until there does not exist a first rooted tree and a second rooted tree, the first rooted tree having a first node and the second rooted tree having a second node with the first and second nodes being in each other's transmission range.

6. The system according to claim 4, wherein each node maintains a list of its neighbors and a list of its neighbor's neighbors, and a shortcut is introduced into the route between a first node on the root and a second node on the route where the first node is either a neighbor of the second node or a neighbor of a neighbor of the second node.

* * * * *